(12) United States Patent
Subramanian et al.

(10) Patent No.: US 9,569,640 B2
(45) Date of Patent: *Feb. 14, 2017

(54) TAMPER DETECTION AND RESPONSE IN A MEMORY DEVICE

(71) Applicant: Everspin Technologies, Inc., Chandler, AZ (US)

(72) Inventors: Chitra K. Subramanian, Mahopac, NY (US); Halbert S. Lin, Austin, TX (US); Syed M. Alam, Austin, TX (US); Thomas Andre, Austin, TX (US)

(73) Assignee: Everspin Technologies, Inc., Chandler, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/832,495

(22) Filed: Aug. 21, 2015

(65) Prior Publication Data

US 2015/0356322 A1 Dec. 10, 2015

Related U.S. Application Data

(62) Division of application No. 14/175,337, filed on Feb. 7, 2014, now Pat. No. 9,135,970.

(Continued)

(51) Int. Cl.
*G11C 11/00* (2006.01)
*G11C 5/14* (2006.01)
(Continued)

(52) U.S. Cl.
CPC .............. *G06F 21/79* (2013.01); *G06F 21/60* (2013.01); *G11C 7/24* (2013.01); *G11C 11/1673* (2013.01);
(Continued)

(58) Field of Classification Search
CPC .......... G11C 11/16; G11C 11/15; G11C 29/44; G11C 11/5685; G11C 16/225; G11C 13/004; G11C 16/3431; G11C 13/0033; G11C 13/0069; G11C 16/3454
See application file for complete search history.

(56) References Cited

U.S. PATENT DOCUMENTS

| | | |
|---|---|---|
| 4,534,018 A | 8/1985 | Eckert et al. |
| 5,715,431 A | 2/1998 | Everett et al. |

(Continued)

OTHER PUBLICATIONS

United States International Searching Authority, International Search Report and Written Opinion mailed May 22, 2014 for International Application No. PCT/US2014/015319.

*Primary Examiner* — Hien Nguyen

(57) ABSTRACT

A technique for detecting tampering attempts directed at a memory device includes setting each of a plurality of detection memory cells to an initial predetermined state, where corresponding portions of the plurality of detection memory cells are included in each of the arrays of data storage memory cells on the memory device. A plurality of corresponding reference bits on the memory device permanently store information representative of the initial predetermined state of each of the detection memory elements. When a tamper detection check is performed, a comparison between the reference bits and the current state of the detection memory cells is used to determine whether any of the detection memory cells have changed state from their initial predetermined states. Based on the comparison, a tamper detect indication is flagged if a threshold level of change is determined. Once a tampering attempt is detected, responses on the memory device include disabling one or more memory operations, generating a mock current to emulate current expected during normal operation, and erasing data stored on the memory device.

20 Claims, 6 Drawing Sheets

Related U.S. Application Data

(60) Provisional application No. 61/762,526, filed on Feb. 8, 2013, provisional application No. 61/870,825, filed on Aug. 28, 2013.

(51) Int. Cl.
    *G06F 21/79*     (2013.01)
    *G11C 7/24*     (2006.01)
    *G11C 11/16*     (2006.01)
    *G06F 21/60*     (2013.01)
    *G11C 13/00*     (2006.01)

(52) U.S. Cl.
    CPC ....... *G11C 11/1695* (2013.01); *G11C 13/0002* (2013.01); *G11C 13/004* (2013.01); *G11C 13/0059* (2013.01); *G11C 13/0069* (2013.01); *G11C 2013/0054* (2013.01); *G11C 2013/0073* (2013.01)

(56) References Cited

U.S. PATENT DOCUMENTS

| | | |
|---|---|---|
| 6,085,299 A | 7/2000 | Angelo et al. |
| 6,232,886 B1 | 5/2001 | Morand |
| 7,046,569 B2 | 5/2006 | Ito et al. |
| 7,188,282 B2 | 3/2007 | Walmsley |
| 7,224,600 B2 | 5/2007 | McClure |
| 7,447,056 B2 | 11/2008 | Scheuerlein et al. |
| 7,911,839 B2 | 3/2011 | Ahmed |
| 7,945,792 B2 | 5/2011 | Cherpantier |
| 7,951,008 B2 | 5/2011 | Wolf et al. |
| 8,294,577 B2 | 10/2012 | Deak |
| 9,135,970 B2 * | 9/2015 | Subramanian ........... G11C 7/24 |
| 9,218,509 B2 | 12/2015 | Alam et al. |
| 2002/0008987 A1 | 1/2002 | Numata et al. |
| 2005/0108366 A1 | 5/2005 | Bodin et al. |
| 2006/0179490 A1 | 8/2006 | Lenssen et al. |
| 2007/0101131 A1 | 5/2007 | Davtchev et al. |
| 2007/0168680 A1 | 7/2007 | Jonas |
| 2012/0033490 A1 | 2/2012 | Rao et al. |
| 2012/0185636 A1 | 7/2012 | Leon et al. |
| 2012/0216001 A1 | 8/2012 | Ramly et al. |
| 2012/0311396 A1 | 12/2012 | Andre et al. |
| 2014/0035560 A1 | 2/2014 | Olmos et al. |

* cited by examiner

TAMPER DETECTION AND RESPONSE IN A MEMORY DEVICE

CROSS REFERENCE TO RELATED APPLICATIONS

This application is a divisional of U.S. patent application Ser. No. 14/175,337, filed Feb. 7, 2014 (still pending). This application and U.S. patent application Ser. No. 14/175,335 claim priority to and the benefit of U.S. Provisional Application No. 61/762,526 filed Feb. 8, 2013, and U.S. Provisional Application No. 61/870,825 filed Aug. 28, 2013. The contents of application Ser. No. 14/175,337 and provisional applications 61/762,526 and 61/870,825 are incorporated by reference herein in their entirety.

TECHNICAL FIELD

The disclosure herein relates generally to memory devices and more particularly to circuits and methods for responding to tamper detection in a memory device.

BACKGROUND

Resistive memory devices store information by controlling the resistance across each memory cell such that a read current through the memory cell in the memory device will result in a voltage drop having a magnitude that is based on the information stored in the memory cell. For example, in certain magnetic memory devices, the voltage drop across a magnetic tunnel junction (MTJ) in each memory cell can be varied based on the relative magnetic states of the magnetoresistive layers within the memory cell. In such memory devices, there is typically a portion of the memory cell that has a fixed magnetic state and another portion that has a free magnetic state that is controlled to be either parallel or antiparallel to the fixed magnetic state. Because the resistance through the memory cell changes based on whether the free portion is parallel or antiparallel to the fixed portion, information can be stored by setting the orientation of the free portion. The information is later retrieved by sensing the orientation of the free portion. Such magnetic memory devices are well known in the art.

Memory devices, including magnetic memory devices, may be used in applications in which tampering is a concern. For example, magnetic memory devices may be used in smart meters or gaming applications. In such applications, a user may attempt to tamper with the data stored within the memory device by applying an external magnetic field or other external stimulus in an attempt to modify the information stored within the memory device.

Therefore, it is desirable to provide techniques for detecting such tampering attempts as well as responsive measures to help preserve the viability of such memory devices in various applications in which tampering is a concern.

DETAILED DESCRIPTION

Figure 1:
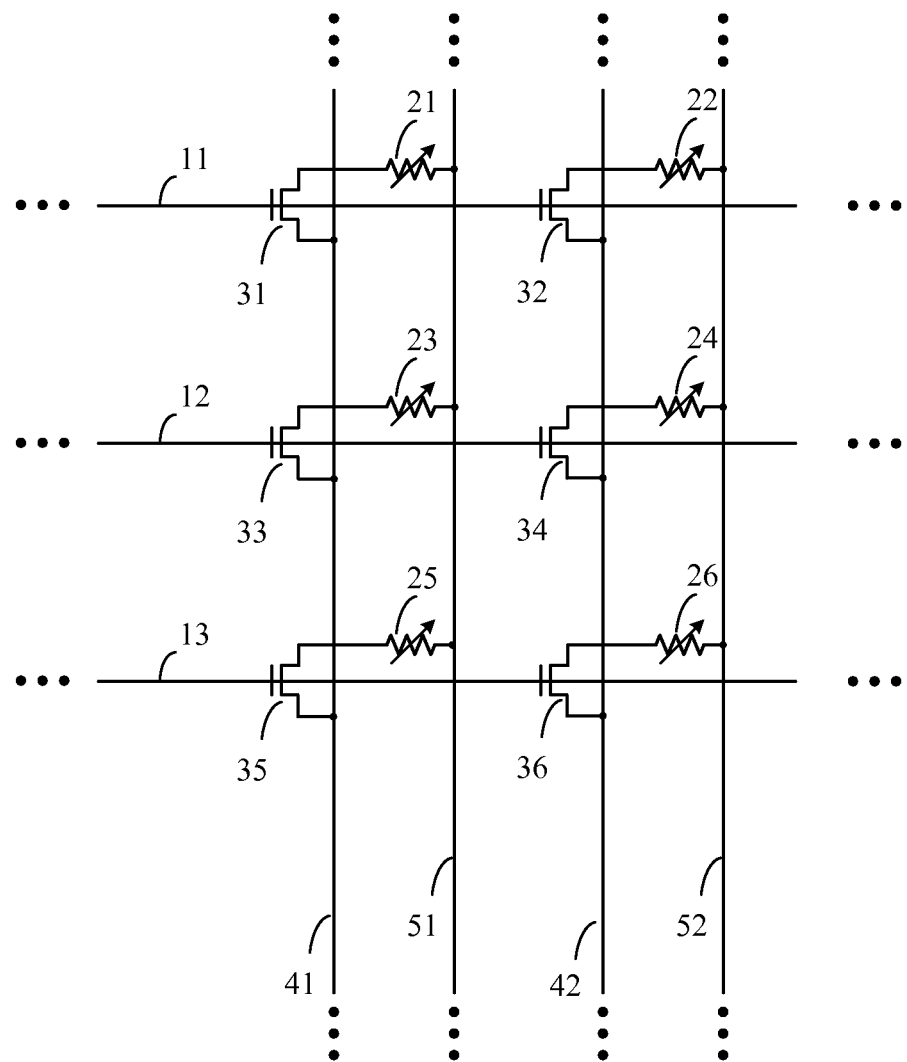
FIG. 1 is a schematic diagram of a portion of a magnetic memory device in accordance with an exemplary embodiment.

The following detailed description is merely illustrative in nature and is not intended to limit the embodiments of the subject matter or the application and uses of such embodiments. Any implementation described herein as exemplary is not necessarily to be construed as preferred or advantageous over other implementations.

For simplicity and clarity of illustration, the figures depict the general structure and/or manner of construction of the various embodiments. Descriptions and details of well-known features and techniques may be omitted to avoid unnecessarily obscuring other features. Elements in the figures are not necessarily drawn to scale: the dimensions of some features may be exaggerated relative to other elements to assist improve understanding of the example embodiments.

The terms "comprise," "include," "have" and any variations thereof are used synonymously to denote non-exclusive inclusion. The term "exemplary" is used in the sense of "example," rather than "ideal."

In the interest of conciseness, conventional techniques, structures, and principles known by those skilled in the art may not be described herein, including, for example, standard magnetic random access memory (MRAM) process techniques, generation of bias voltages, fundamental principles of magnetism, and basic operational principles of memory devices.

During the course of this description, like numbers may be used to identify like elements according to the different figures that illustrate the various exemplary embodiments.

For the sake of brevity, conventional techniques related to reading and writing memory, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Nonvolatile memory devices are often used in various applications in order to store data that remains valid after power is no longer applied. Examples of such nonvolatile memory devices include resistive memory devices such as magnetic random access memory (MRAM) in which the resistance experienced by current flowing through the memory cell varies based on the orientation of magnetic vectors within the memory cell and where such resistance variations are used to store data.

Examples of applications in which MRAM devices are used include gaming machines (e.g. slot machines) as well as smart meters that, for example, monitor electrical power usage. In such example applications, a casino or power company that is relying on the memory devices to accurately store the desired information may be concerned with potential tampering. For example, a casino may be concerned that someone will attempt to alter the information stored within memory devices of a slot machine using a strong magnetic field or some other type of disruption, including, for example, electromagnetic interference, a high heat source, or charge bombardment. In such applications, it is desirable to be able to determine whether or not an attempt to tamper with the memory devices has occurred. Moreover, when such a tampering attempt is detected, it may be desirable to disable further reading from or writing to the memory device. It may be also desirable to the erase the data stored on the memory device when tampering is detected.

While a number of different techniques for detecting tampering attempts are known in the art, the present application discloses additional techniques that may be employed for detecting a tampering attempt. For example, in one embodiment, a set of detection memory cells are included with each array of memory cells used to store data on the memory device. In some embodiments, the detection memory cells have the same structure as the data storage memory cells, whereas in other embodiments, the detection memory cells are more sensitive to tampering attempts than the data storage memory cells. By storing an initial predetermined state in the detection memory cells and providing corresponding reference bits on the memory device that permanently store the expected state of the detection memory cells, a later comparison of the state of the detection memory cells with the reference bits can indicate whether or not one or more of the detection memory cells has been altered from its initial predetermined state. Such a comparison facilitates a determination as to whether or not an attempt to tamper with the data stored in the memory cells of the memory device has occurred.

Once a tamper-attempt indication has been determined, circuitry within the memory device can be employed to disable one or more memory operations within the memory device. For example, it may be desirable to disable further data reads from the memory device, data writes to the memory device, or both. In some embodiments, such memory operation disabling is accomplished by altering bias voltages associated with the circuitry used to read and write data to the memory device. In other embodiments, disabling can occur by gating off a needed current path used as a part of the read or write operation. For example, a transistor may be controlled that prevents current from flowing through a certain aspect of the circuitry, thereby preventing the memory operation from being performed. In yet other embodiments, circuitry used for data masking on the device may be employed to alter or limit the ability of the memory device to read or write data from the data storage memory cells.

When a memory operation is disabled within the memory device, a mock current can be generated on the memory device in response to an attempt to perform the disabled memory operation. By simulating the current that would normally result from performing the memory operation that has been disabled, someone attempting to operate the tampered-with memory device may be led to believe that the device is continuing to operate normally even though the memory operation that is being attempted is not actually being performed. As discussed further below, there are many techniques available to generate the appropriate mock current.

FIG. 1 is a schematic block diagram showing a portion of an example memory device that includes a plurality of memory cells 21-26 arranged in rows and columns. In one embodiment, the memory cells are resistive memory elements where information stored in each memory cell is represented by different amounts of resistance perceived by current flowing through the memory cell. Examples of such memory cells include MRAM cells such as spin-torque MRAM cells. In one embodiment, each of the memory cells includes an MTJ where the resistance through the memory cell indicates the information stored in the memory cell.

Each of the memory cells 21-26 has a corresponding selection transistor 31-36 that allows the particular memory cell to be selected for read and write operations. The selection transistors 31-36 are preferably thin-oxide devices with low threshold voltage for a higher current drive capability. Each set of a selection transistor 31-36 and corresponding memory cell 21-26 is coupled in series between a source line 41, 42 and a bit line 51, 52. For example, memory cell 21 is coupled in series with selection transistor 31 between bit line 51 and source line 41.

Each of the rows of memory cells can be selected for read and write operations based on a corresponding word line 11-13 being asserted. As illustrated, word line 11 is used to select memory cells 21 and 22 via their corresponding selection transistors 31 and 32. Similarly, word line 12 selects memory devices 23 and 24, whereas word line 13 selects memory devices 25 and 26. As one of ordinary skill in the art appreciates, each row may include hundreds or thousands of memory cells, and the memory device includes many rows one or more arrays. Word line circuitry not shown in FIG. 1 decodes address information provided to the memory device to determine which of the rows of memory cells is to be accessed for reading and/or writing.

The source lines 41-42 and bit lines 51-52 are used in both reading and writing the memory cells 21-26. Source line and bit line selection circuitry, sense amplifiers, and write drivers associated with the source lines and bit lines, which are not shown, enable read and write currents to be passed through selected memory cells to both store information and later retrieve that information. Examples of such sense amplifiers, write drivers, and related circuitry are discussed in U.S. patent application Ser. No. 13/362,599.

In one embodiment, when one or more memory cells in a row are to be accessed, the information stored in each of the memory cells in the row is sensed and stored in local data-store latches. Such an operation is sometimes referred to as an activate operation. In accordance with the disclosure in U.S. patent application Ser. No. 13/362,599, the activate operation can include a self-referenced read operation that determines the information stored in each of the selected memory cells in the selected row. The self-referenced read operation includes first sampling the resistance of each of the selected memory cells in the selected row. After sampling the resistance of the selected memory cells in the row, the memory cells are all written to a first state. For example, all of the memory cells may be written to a logical "0." Following the write to the selected memory cells, the resistance of each of the memory cells is sampled again and compared with the previous sample taken from the same memory cell before the write operation. Based on the comparison, the original state of the memory cell (i.e. "1" or "0") can be determined based on whether or not the resistance changed significantly as a result of the writing operation. Such a self-referenced read ensures that deviations between the resistance values of different memory cells do not impact the ability to sense the information stored therein.

Once the activate operation is complete and the information from the selected row is in the local data-store latches, read and write operations can be performed by retrieving data from and storing data into the local data-store latches. When the read and write operations corresponding to the selected row are complete, a precharge operation is performed. While read and write operations to the activated row typically occur before precharging, the precharge operation can also be performed immediately after an activate operation. During the precharge operation, the information in the local data-store latches is transferred to the memory cells in the corresponding row within the memory array. Note that because the entire-row write operation performed during the sensing operation has left all of the selected memory cells in the row in the first state, only those memory cells that need to be changed to the second state are written during the precharge operation. For example, if the sensing operation writes all of the memory cells to a logic "0" (first state), then only those memory cells that are to store a logic "1" (second state) need to be written during the precharge operation. One of ordinary skill in the art appreciates that the first state may correspond to either a logic "1" or "0" such that the second state corresponds to the complementary "0" or "1" logic value.

For a spin-torque MRAM, the first state can be stored in the memory cell by sending a write current of sufficient magnitude through the memory cell in a first direction. Storing the second state in the memory cell is accomplished by sending a write current of sufficient magnitude through the memory cell in a second, opposite direction. The write currents are typically much greater than the read current used to sense the resistance of the memory cell.

Figure 2:
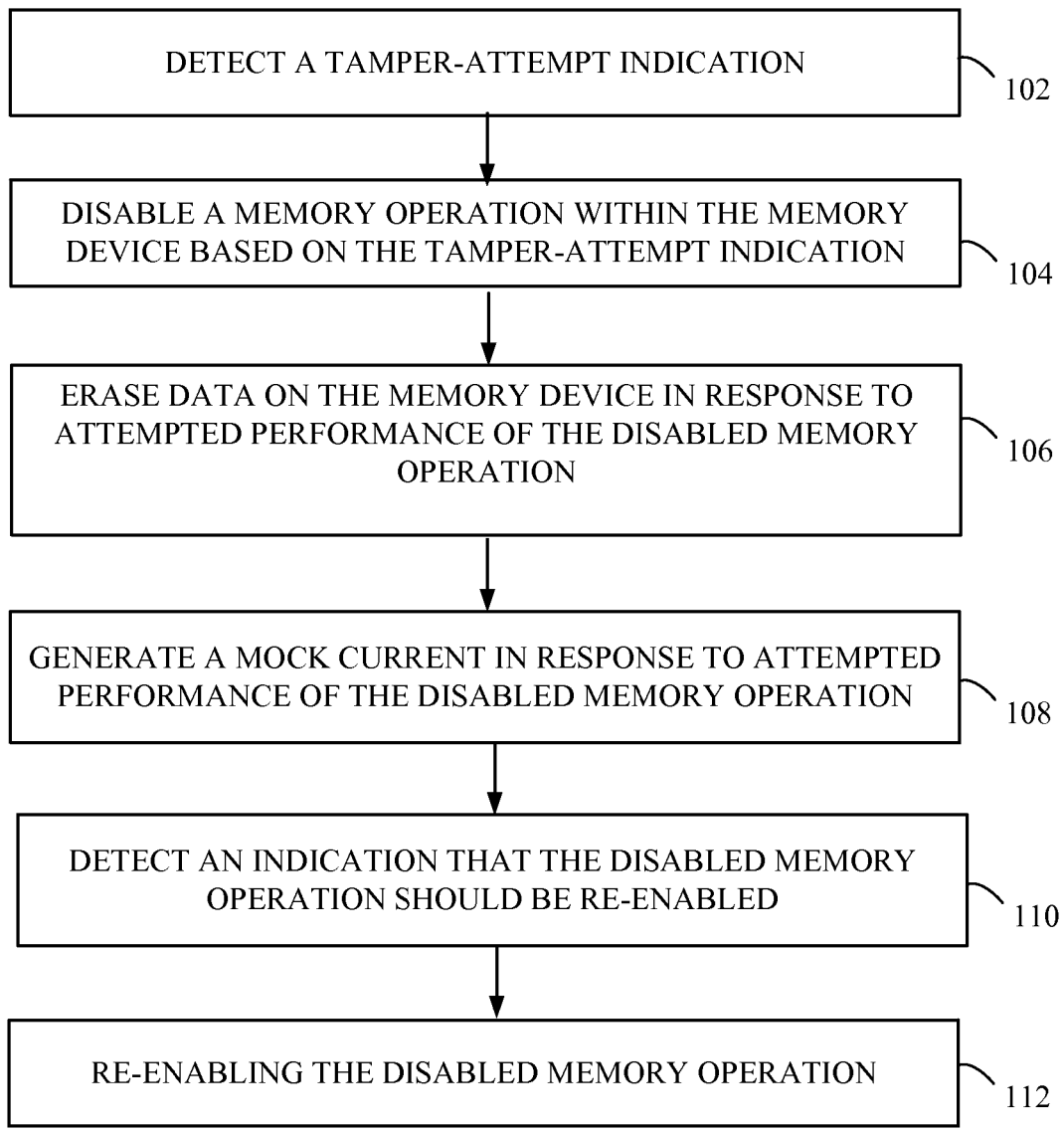
FIG. 2 is a flow diagram of a method of operation for responding to a tamper-attempt indication in accordance with an exemplary embodiment.

FIG. 2 illustrates a flow diagram corresponding to a method for responding to a tamper attempt indication within a memory device, where, in one example, the memory device includes a plurality of memory cells arranged as illustrated in FIG. 1. At step 102, a tamper-attempt indication corresponding to the memory device is detected. There are a number of techniques known in the art for detecting an attempt to tamper with a memory device. The tamper-attempt indication detected at step 102 may be the result of employing the tamper detection techniques discussed in additional detail herein, or may be a tamper-attempt indication provided as a result of other tamper detection techniques. The remedial measures employed upon detection of the tamper attempt that are included in FIG. 2 are not limited in any way to the tamper attempt detection techniques described herein, and one of ordinary skill in the art understands that the actions included in FIG. 2 may be performed regardless of how the tamper attempt has been detected.

At step 104, a memory operation within the memory device is disabled based on the tamper-attempt indication. In one embodiment, disabling includes adjusting a voltage corresponding to circuitry on the memory device used in the memory operation that is to be disabled. By altering such a voltage, the performance of the memory operation is prevented, thereby disabling the memory operation. For example, disabling a read or write operation may be accomplished by adjusting one or more bias voltages used in such read or write operations. Specific examples of disabling operations are discussed in additional detail with respect to FIG. 3 below.

In other embodiments, disabling a memory operation at step 104 includes controlling a gate or switch such that at least a portion of the memory operation is disabled. For example, a transistor can be used as a digital switch that prevents current flow necessary for performance of the memory operation. When the switch is turned off, the current flow is prevented, and the memory operation is disabled. In other embodiments, the control voltage applied to the transistor may limit the amount of current flow in the current path such that the resulting current density is inadequate to support the intended operation. For example, in spin torque transfer memory cells, inadequate current flow through the memory cell during a write operation prevents the free portion of the cell from changing its magnetic state, thereby preventing the write operation from occurring. Such inadequate current flow could be achieved by lowering the gate voltage on the selection transistor or by biasing a transistor in series with the bit or source line such that it restricts current flow to a level below the threshold level needed to cause the free portion to change state.

In yet other embodiments, data masking circuitry on the memory device may be used to disable or disrupt memory operations. For example, if data masking circuitry is used in conjunction with a precharge operation such that only certain memory cells in a row of memory cells are written to the second state, that data masking circuitry can be adjusted to not write the second state to any memory cells, write the second state to all memory cells, or write the second state to a set of memory cells that differs from that which would occur if tampering had not been detected. In some embodiments the data mask used to write back the second state to some of the memory cells could be shifted or inverted in order to scramble the data stored in the memory cells.

In addition to disabling one or more memory operations, it may also be desirable to erase the data stored in one or more portions of the memory device in response to attempts to perform memory operations following a tamper attempt detection. At step 106, such erasing occurs. While there are a number of ways for this to be achieved, in one embodiment current flow in one direction through the memory cell is reduced or eliminated such that one of the two states cannot be written to the memory cell. In a specific example related to the memory discussed above with respect to FIG. 1, the current normally used in the precharge operation could be reduced such that the second state cannot be written back to the memory cells, thereby leaving all of the memory cells in the first state as a result of the previous activate operation.

Returning to FIG. 2, at step 108 a mock current is generated in response to an attempt to perform the memory operation that has been disabled. As noted above, when it is determined that an attempt to tamper with the memory device has occurred, in addition to disabling reads and writes to the memory device, it may be desirable to mimic the current that would normally occur on the memory device during performance of the disabled memory operation even though that operation is not actually being performed. By generating a mock current that mimics the current expected from performance of the operation, it may be possible to mislead a user attempting to determine whether his or her attempts to tamper with the memory device have been detected. For example, after attempting to tamper with the memory device, a user may monitor the supply voltages for the memory device during an attempt to perform an activate, read, write, or precharge operation to detect whether the expected changes to the voltage levels on the supply voltages are present. By mimicking the current that would normally flow on the memory device during performance of the memory operation, the user can be misled and will perceive that the operation is actually being performed even though it is not.

In an attempt to disguise the non-performance of the disabled memory operation, the mock current can be generated in a manner that approximates the magnitude of the expected current such that the mock current is configured to correspond to performance of the memory operation that has been disabled. In one embodiment, the mock current is generated by performing a mock operation that executes in generally the same manner as the attempted operation that has been disabled. In such an embodiment, the mock operation does not actually result in the desired data being read from or written to the expected location in the memory device. For example, a dedicated mock row of memory cells can be included on the memory device such that when a write operation directed to a selected row within the memory device is to be performed, the data is instead written to the dedicated mock row of memory cells rather than the row of memory cells intended to be written. In such an embodiment, the current required to store the data in the mock row of memory cells is a very close approximation to that required to store the same data in the actual memory cells to which the disabled operation is directed. In other embodiments, the address corresponding to a read or write could be altered before performing the attempted operation, thereby causing a read or write to actually happen, but resulting in the data being written to or read from the wrong location. Such redirected operations would also produce the expected current flow on the device.

In other embodiments, generation of the mock current may not involve actually reading or writing data, but may take into account the data associated with the memory operation that has been disabled. For example, if the set of data bits to be written to the memory device would result in a particular amount of expected current based on the number of logic "1's" and "0's" in the data set, the magnitude of the mock current can be adjusted to align with the expected current by taking into account the data associated with the disabled operation. In other embodiments, a worst-case current is generated that corresponds to an approximate maximum that results from actual performance of the memory operation that has been disabled. In yet other embodiments, an average current corresponding to the disabled memory operation could be generated as the mock current. In embodiments where the mock current is generated, different mock currents for reads and writes may be appropriate.

One of ordinary skill in the art appreciates that there are many techniques and circuits for generating the mock currents discussed herein. For example, crowbar circuits in which a power supply is gated by a transistor coupled in series with a resistance to ground can be used to generate such mock currents. In such circuits, the transistor can be controlled in a manner that limits the current flow in order to provide flexibility in terms of magnitude. Alternately, the resistance can be adjusted to vary the magnitude of current flow. In other embodiments, multiple crowbar circuits or similar current generation circuits may be employed in parallel, where the number of circuits activated determines the magnitude of current. In yet other embodiments, multiple current generators of different magnitudes may be employed where a binary encoded selection means selectively enables a subset of the current generators in order to provide high granularity in terms of mock current magnitude. A simplistic example can help illustrate such techniques. Assuming 16 bits of data are to be written during a write operation that has been disabled. In one embodiment, 16 separate current generation circuits are utilized where the number of current generation circuits turned on is directly determined by the number of logic "1's" in the 16 bits to be written. In an alternate embodiment, a weighted set of current generators are used. For example, the weighted set includes a current generator that generates the amount of current corresponding to eight of the bits being written as logic "1's", a current generator that generates the amount of current corresponding to four of the bits being written as logic "1's", a current generator that generates the amount of current corresponding to two of the bits being written as logic "1's", and a current generator that generates the amount of current corresponding to one of the bits being written as a logic "1". In such an embodiment, the data corresponding to the write operation can be used to select one or more of the weighted current generators in order to properly mimic the expected current. For example, if the data set to be written includes nine logic "1's", the current generator that generates current corresponding to eight logic "1's" and the current generator that generates current corresponding to one logic "1" are enabled to generate the mock current.

Returning to FIG. 2, at step 110, an indication that the memory operation that has been disabled is to be re-enabled is detected. Although it may be desirable to disable one or more memory functions when tampering is detected, it may also be useful to be able to re-enable the disabled memory functions at some later point in time. In order to facilitate this, the memory device may include circuitry to detect a sequence of inputs or an input code that overrides or resets the tamper detection circuitry or response circuitry such that normal memory operation, or some selected portion of normal memory operation (e.g. only reads may be enabled), resumes. Once the sequence of inputs or input code has been presented to the memory device and detected at step 110, the method proceeds to step 112 where the memory operation that has been disabled is re-enabled. In embodiments in which disabling includes adjusting a voltage corresponding to circuitry on the memory device used in the disabled memory operation, re-enabling the memory operation includes restoring the voltage to its normal operational level such that the memory operation is no longer disabled.

Figure 3:
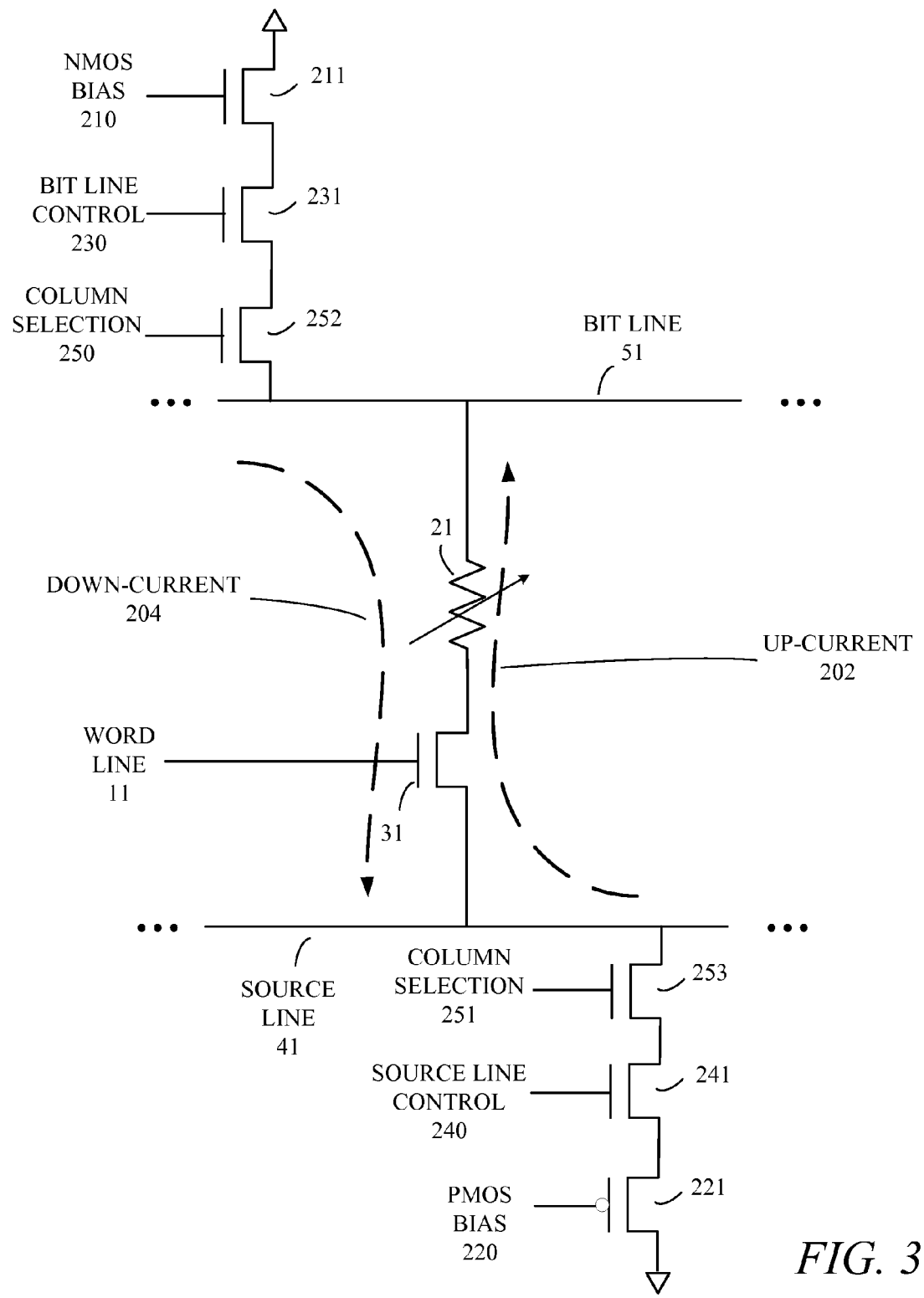
FIG. 3 is a schematic diagram of a portion of a magnetic memory device in accordance with an exemplary embodiment.

FIG. 3 illustrates a schematic diagram corresponding to a portion of the memory device of FIG. 1 with the additional depiction of memory access circuitry associated with the array of memory cells. As shown in FIG. 3, memory cell 21 is connected in series with selection transistor 31. Word line 11 is coupled to the gate of selection transistor 31, thereby allowing for a row decode operation to select a set of memory cells that includes memory cell 21 by asserting word line 11. Column decode operations that result in selection of memory cell 21 cause column selection inputs 250 and 251 to be asserted high to column selection transistors 252 and 253. Selection transistor 31 and memory cell 21 are connected in series between bit line 51 and source line 41. By controlling word line 11 as well as additional memory access circuitry related to bit line 51 and source line 41, each of the down-current 204 and up-current 202 can be generated and controlled in order to access memory cell 21. As discussed above, down-current 204, when of a sufficient magnitude, results in a first state being stored in memory cell 21, whereas up-current 202, when of a sufficient magnitude, results the second state being stored in memory cell 21.

As described above with respect to FIG. 2, when a tamper attempt indication is detected, one or more memory operations within the memory device can be disabled. Such disabling can be accomplished by changing one or more voltages associated with the circuitry used to access the memory cells to which the operation is directed. For example, within the context of FIG. 3, various voltages are available for adjustment in order to prevent different memory operations from occurring. As an example, one or both of the bias voltages, NMOS bias 210 and PMOS bias 220, can be adjusted in order to restrict the amount of current flow allowed to pass through the memory cell 21. For example, if NMOS bias 210 is reduced, transistor 211 will limit the current flow there through, where if the current flow is restricted to a level below the threshold needed to switch the free portion of memory cell 21, the memory operation associated with that current will be disabled. Similarly, PMOS bias 220 can limit the current flow through transistor 221. In one embodiment, transistor 211 is configured as an NMOS-follower circuit and transistor 221 is configured as a PMOS-follower circuit and the bias voltage adjusted to disable the memory operation corresponds to one of the bias voltages associated with those follower circuits. Techniques for generation of bias voltages used for biasing transistors 211 and 221 are well-known in the art.

In addition to, or as an alternative to, adjusting the NMOS or PMOS follower bias voltages, the voltage on word line 11 applied to selection transistor 31 can also be adjusted by altering the bias voltages associated with driving word line 11. A lower voltage applied to word line 11 limits current flow through transistor 31, thereby providing a means for reducing the current flow through the memory cell 21 below the threshold necessary for the free portion of the memory cell to switch. U.S. patent application Ser. No. 14/051,762 provides details as to word line driving circuits in which various voltages could be adjusted in order to control the voltage applied on word line 11.

The circuit of FIG. 3 also includes transistors 231 and 241 which may be used to gate off current flow through memory cell 21. As was the case with the transistors 211 and 221, the control voltage applied to the gate of transistors 231 and 241 can be used to limit current flow through those transistors thereby also limiting current flow through memory cell 21. In other embodiments, transistors 231 and 241 may be used as digital switches, where, for example, if the source line control signal 240 is low, current flow through transistor 241 is prevented, thereby disabling down-current 204. Similarly, a low value on bit line control signal 230 would prevent current flow through transistor 231. One of ordinary skill in the art appreciates that such gating transistors that allow or prevent current flow through the memory cell can be placed in a variety of positions within the circuit and still achieve the desired control as to whether or not current can flow. While FIG. 3 includes transistors 231 and 241 in order to aid in describing the various embodiments discussed herein, such transistors would not be required in an embodiment in which a bias voltage such as NMOS bias 210, PMOS bias 220, or another bias voltage associated with word line 11 was used to disable memory operations.

In addition to being able to gate off current through memory cell 21 using either transistor 231 or transistor 241, a similar transistor could be included in the word line driving circuitry such that any voltage to be driven on word line 11 is prevented from reaching the gate of transistor 31. Such gating off functionality can be applied in many different locations within the word line driving circuitry.

The control of the various bias voltages or transistors used for limiting or gating off current discussed in conjunction with FIG. 3 can be dynamic within the context of a particular operation. For example, an activate operation may include multiple different currents being passed through memory cell 21 in order to ascertain the state stored in memory cell 21. Within the context of that activate operation, if the up-current 202 is used in the precharge operation to write back the second state to memory cells that originally stored data represented by the second state, disabling the write back aspect could result in all of the selected memory cells remaining in the first state at the conclusion of the activate operation, thereby effectively erasing the information previously stored therein.

While not shown in FIG. 3, the sense amplifier circuitry used in determining the state stored in memory cell 21 can also be adjusted in order to disable certain memory operations. For example, in one embodiment, there is an offset voltage associated with the sense amplifiers where the offset voltage allows for a better comparison between the resistance initially sensed for the memory cell 21 and the resistance sensed after the memory cell 21 has been written to a known state. In one embodiment, the offset corresponds to approximately one half of the difference between the expected resistance of the memory cell in the first state and the expected resistance in the second state. By adjusting the offset applied in comparing the sensed resistance of the memory cell within the sense amplifier circuitry, accurate sensing of the state stored in memory cell 21 can be either impeded or prevented. For example, the offset may be adjusted such that a false state will be determined a certain percentage of the time, or the offset may be adjusted such that the sense amplifier always determines that the memory cell stores one of either the first state or the second state.

Figure 4:
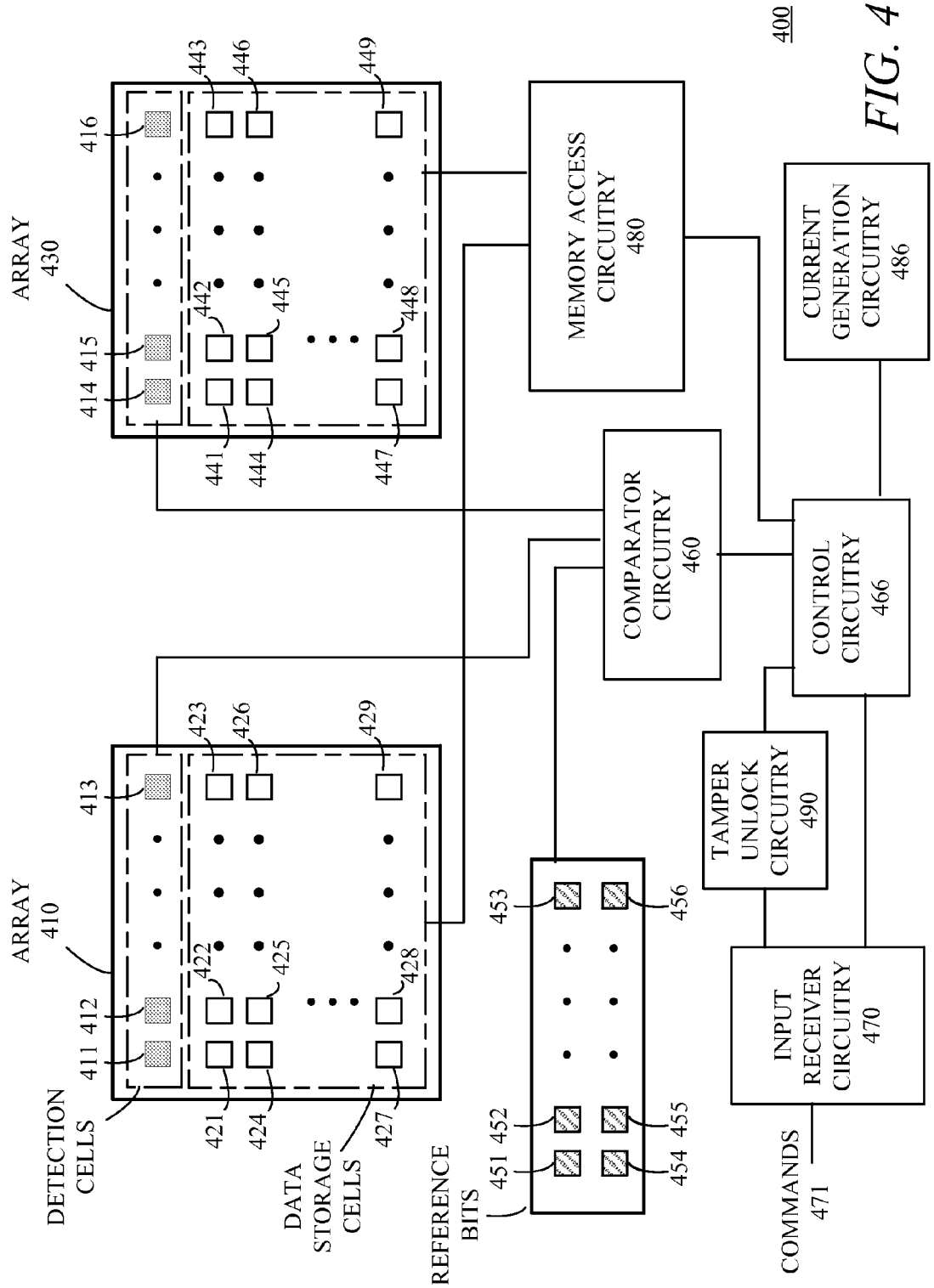
FIG. 4 is a block diagram of a portion of a memory device in accordance with an exemplary embodiment.

FIG. 4 illustrates a block diagram of a memory 400. Memory 400 may be a resistive memory such as an MRAM in which each of the memory cells includes a magnetic tunnel junction. Memory 400 includes circuitry to detect an attempt to tamper with the memory 400 as well as circuitry for responding to the detection of such a tamper attempt. As discussed above, while specific techniques for detecting attempted tampering are disclosed herein, other tamper detection techniques are known. Thus, while the tamper detection circuitry is presented together with the circuitry for responding to a tamper attempt, they may be used independently of each other.

The memory 400 includes arrays 410 and 430, each of which includes a plurality of detection memory cells 411-413 and 414-416, respectively. The number of arrays as well as the number of memory cells illustrated are examples in order to aid in conveying the teachings presented herein and should not be viewed as limiting in any way. In addition to the detection memory cells 411-416, arrays 410 and 430 include plurality of data storage memory cells 421-429 and 441-449, respectively. The data storage memory cells 421-429 and 441-449 are arranged in rows and columns and configured to be accessed for data storage and retrieval based on commands received by memory 400. Detection memory cells 411-416 are each configured to be pre-programmed to a respective initial predetermined state. The initial predetermined state of each of the plurality of detection memory cells 411-416 is configured to be unmodifiable by commands directed to the memory device. For example, the detection memory cells 411-416 may be programmed during manufacturing through a special configuration mode that is later disabled by, for example, blowing a fuse to disable the configuration mode.

The structure of the detection memory cells 411-416 may be identical to that of the data storage memory cells 421-429 and 441-449, or, in other embodiments, the detection memory cells 411-416 may be designed in a manner that renders them more susceptible to attempted tampering. In some embodiments, the detection memory cells 411-416 are placed within each of the arrays 410 and 430 at a position that maximizes their exposure to attempted tampering. For example, the detection memory cells 411-416 may be placed in a top row of their corresponding arrays where they are most vulnerable to attempted tampering by, for example, an external magnetic disturb. Each array on the memory device may include a plurality of such detection memory cells, where the number of detection memory cells may be chosen to provide the proper balance between additional cost and effectiveness in detecting attempted tampering. Distributing the detection memory cells throughout the memory device 400 helps ensure that tamper attempts are detected regardless of how the magnetic disturb is directed at the memory device 400.

Memory 400 also includes a plurality of reference bits 451-456. Each of the plurality of reference bits 451-456 corresponds to a respective one of the plurality of detection memory cells. The initial predetermined state of each detection memory cell 411-416 is represented by a corresponding reference bit of the plurality of reference bits 451-456. In the example illustrated, reference bit 451 corresponds to detection memory cell 411, whereas reference bit 454 corresponds to detection memory cell 414. In exemplary embodiments, the reference bits 451-456 are permanently stored on the memory device. This can be achieved by, for example, using fuses on the device to store the reference bits or by encoding the values of the reference bits using metal deposition, where metal is selectively deposited within a circuit to represent a "1" or a "0" for the reference bit. Such techniques are well-known in the art. Thus, either during manufacturing, or later prior to distribution, the reference bits 451-456 and detection memory cells 411-416 for the memory 400 are set in a manner such that each detection memory cell has a pre-programmed initial value that is also represented by a permanent reference bit. While the embodiment of FIG. 4 contemplates each of the detection cells storing either a logic "0" or "1" based on the resistance seen by current passing through the detection cell, in other embodiments, the detection cells may provide non-binary sensing such that more than two levels of resistance can be recognized, where such multi-level state storage provides more detection granularity than a binary state change. In such alternative embodiments, multi-level reference cells can be used in place of reference bits, where the multi-level reference cells can store more than two states and thereby provide resistance comparison granularity matching the detection granularity used with respect to the detection cells.

Memory 400 can sense whether a tamper attempt has occurred by performing a comparison of the detection memory cells 411-416 with the reference bits 451-456. Comparator circuitry 460 compares the current state of each detection memory cell 411-416 with its corresponding reference bit 451-456. The comparison may be performed based on control provided by a state machine, which may be included in control circuitry 466. Comparing the current state of each of the detection memory cells 411-416 may include performing a read operation corresponding to the detection memory cells 411-416 in the same manner as is employed to read data from the data storage memory cells 421-429 and 441-449 within the memory. In other embodiments, the state of the detection memory cells 411-416 may be compared with the reference bits 451-456 using other means. In some embodiments, all of the detection memory cells 411-416 are compared with their respective reference bits 451-456, whereas in other embodiments, only a subset of the detection memory cells may be compared with their respective reference bits at a particular point in time. In some embodiments, performing the comparison includes loading a starting address for the detection memory cells and auto-incrementing through the addresses in order to access all of the detection memory cells. Performing the comparison may also include generating timing signals that are used in performing the internal read and compare sequence that senses the state of the detection memory cells and compares those states with their expected states that are permanently stored on the memory device.

The comparison performed by comparator circuitry 460 may occur periodically based on some preset schedule, or may be in response to a command received by the memory device 400. For example, such a command can be received by an interface such as input receiver circuitry 470 which receives commands 471. Thus, a user may issue a command indicating a tamper detection check, where the comparator will perform the comparison in response to such a command. In addition to providing a command indicating a tamper detection check should occur, the user may be required to provide additional information such as address information or timing information in the form of clocks in order to instigate a tamper check.

After performing the comparison, the comparator circuitry 460 generates a tamper-attempt indication if it is determined that a threshold number of detection memory cells no longer store their initial predetermined state. In one example, if the comparison indicates that more than two of the detection memory cells have changed state from their initial predetermined state, a signal indicating attempted tampering is generated. Different thresholds may be employed such that as few as one deviation in the expected values of the detection memory cells could flag a tamper attempt, whereas in other embodiments, higher numbers of deviations from the expected values may be required in order to cause a tamper-attempt indication to be generated. In other embodiments, a discrepancy in up to two of the detection memory cells may be corrected using ECC and no tamper attempt flagged, thereby allowing for some deviation from expectations before flagging a tamper attempt. The signal indicating attempted tampering can be used internally by the memory device and/or output from the memory device to, for example, a user that requested that a tamper check be performed. Outputting a signal indicating that tampering has been attempted can be accomplished using either a dedicated pin on the memory device or by using a shared output pin, such as one of the pins associated with data output.

In addition to including circuitry for determining whether or not tampering has been attempted, memory device 400 also includes circuitry for responding to a tamper-attempt indication. Memory device 400 includes control circuitry 466 coupled to the comparator 460, where the control circuitry is configured to disable a memory operation within the memory device 400 based on a tamper attempt indication provided by the comparator. Thus, as discussed above with respect to FIGS. 1-3, when tampering is detected, one or more memory operations may be disabled. Memory access circuitry 480, which is coupled to the arrays 410 and 430 and the control circuitry 466, includes the circuitry used for reading from and writing to the data storage memory cells 421-429 and 441-449. As discussed above with respect to FIG. 3, the memory access circuitry may include at least one bias voltage associated with the memory operation to be disabled, and the control circuitry 466 may be configured to disable the memory operation by adjusting the bias voltage within memory access circuitry 480 such that the adjusted bias voltage that results is inadequate to support performance of the memory operation to be disabled. In other embodiments, the control circuitry 466 may control one or more transistors used to limit or gate off current flow through one or more of the data storage memory cells such that an attempted memory operation is rendered inoperable.

Memory device 400 may also include current generation circuitry 486 coupled to the control circuitry 466, where the current generation circuitry 486 is configured to generate a mock current on the memory device 400 that simulates current generated during performance of the disabled memory operation when not disabled. Thus, as discussed above, while the memory operation is disabled, it may be desirable to generate a mock current such that the disabling of the memory operation is not apparent to a user attempting to continue to operate the memory device.

Memory 400 may also include tamper unlock circuitry 490 coupled to input receiver circuitry 470 and control circuitry 466. Tamper unlock circuitry 490 detects a sequence of input signals or a code received by input receiver circuitry 470 that indicates that the memory operation disabled in response to a tamper-attempt indication should be re-enabled. As noted above, while one or more memory operations may be disabled in response to attempted tampering, it may be desirable to provide a means to re-enable disabled memory operations by providing a particular code or other sequence of inputs to override or reset the tamper detect or tamper response circuitry.

Figure 5:
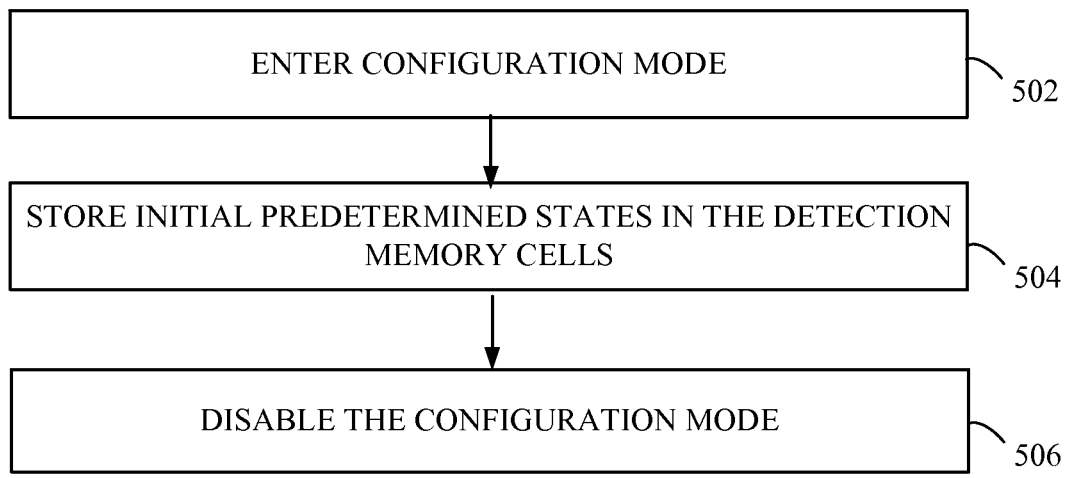
FIG. 5 is a flow diagram of a method of initializing tamper detection circuitry on a device in accordance with an exemplary embodiment.

FIG. 5 illustrates a flow diagram of a method for configuring the detection memory cells in a memory device such as that shown in FIG. 4. As noted above, such configuration may be performed at the factory during manufacturing or at some later point in time prior to putting the memory device into a system for operation. At step 502, a configuration mode is entered. Entering the configuration mode may be accomplished by sending a certain sequence of signals or a command to the memory device. The configuration mode may be associated with a test mode for the memory device that is only available to the manufacturer or the system-developer putting the memory device into a system application.

At step 504, initial predetermined states are written to the detection memory cells within the memory device. The initial predetermined states may be different for different detection memory cells such that, in an example where two possible binary states are stored, deviations from the state representing a "1" as well as deviations from the state representing a "0" can both be detected. In some embodiments, fuses may be used to store the reference bits to be used for comparison with the detection memory cells where the state of the fuse represents the state stored in a corresponding detection memory cell. In such embodiments, writing the predetermined states to the detection memory cells may also include blowing the appropriate fuses to store the reference bits. In other embodiments, the reference bits may be stored in a hardwired manner on the memory device using some sort of metal masking during manufacturing. In such an embodiment, step 504 includes writing the initial predetermined states of the detection memory cells such that they match up with the reference bits already hard-wired on the device.

At step 506, the configuration mode is disabled. Such disabling may be accomplished by blowing a fuse or by some other means that renders the configuration mode unavailable to a future user. By disabling the configuration mode, the detection memory cells cannot be altered from their initial predetermined states once configuration is complete. In other words, the detection memory cells are rendered unmodifiable by subsequent commands directed to the memory device such that deviations in the state of such detection memory cells provides an indication of possible tampering.

Figure 6:
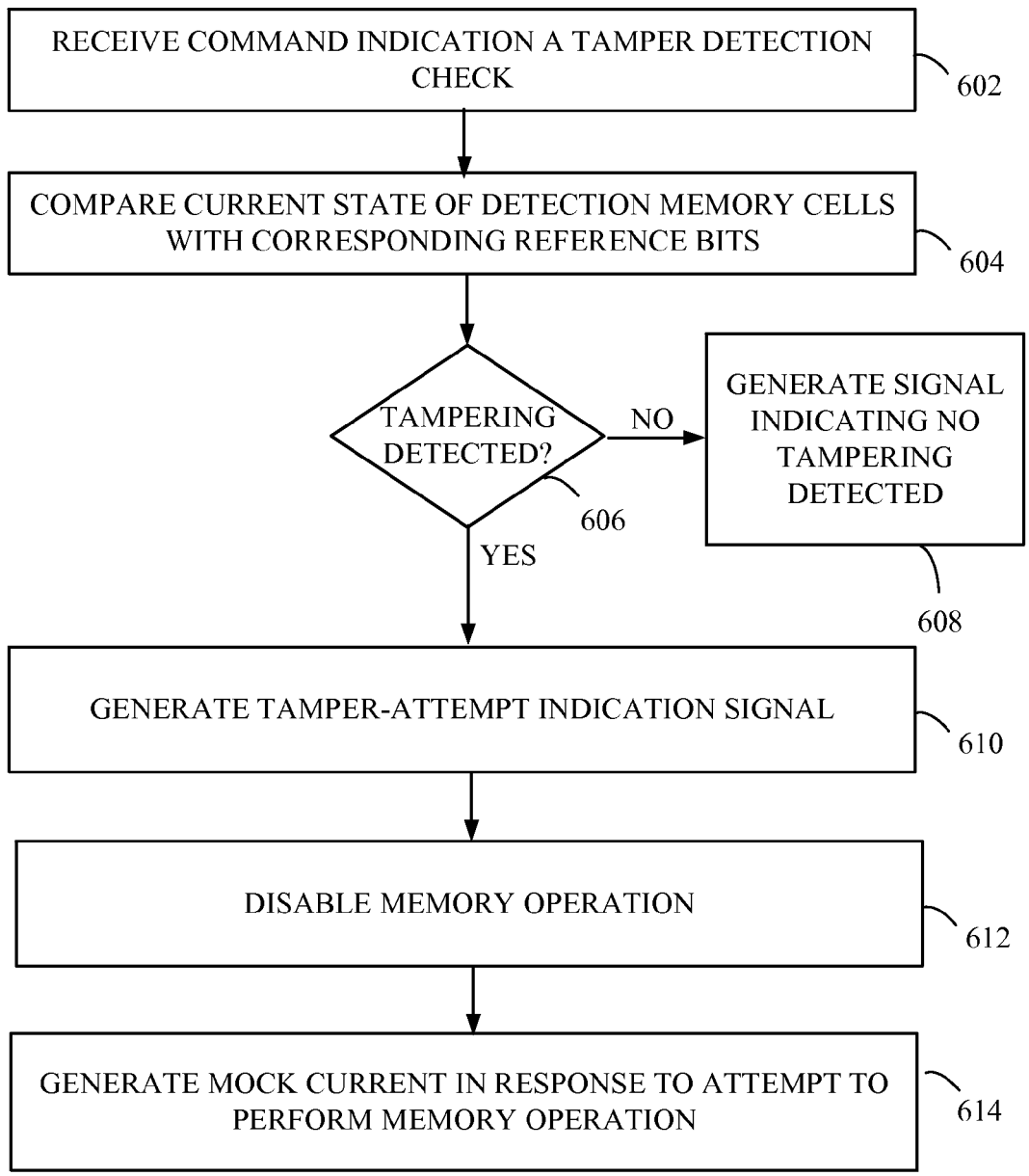
FIG. 6 is a flow diagram of a method for detecting and responding to a tamper attempt in a device in accordance with an exemplary embodiment.

FIG. 6 illustrates a method of detecting a tamper attempt and responding to a tamper attempt indication. At step 602 a command indicating that a tamper detection check should be performed is received. As discussed above, tamper detection checks can be initiated based on commands received from a user or, in other embodiments, based on some internal trigger that may be time-based or based on some other metric such as a number of memory accesses.

At step 604, the current state of the detection memory cells included in the memory are compared with the reference bits corresponding to the initial predetermined states previously stored in the detection memory cells. At step 606, it is determined whether or not a tamper attempt has occurred based on the comparison performed at step 604. As discussed above, tampering may be indicated by one or more detection memory cells having a state that does not match the state represented by its corresponding reference bit. If no tampering is indicated at step 606, the method proceeds to step 608 where a signal is generated indicating that no tampering has been detected. If it is determined at step 606 that a tamper-attempt indication should be generated, the method proceeds to step 610 at which a tamper-attempt indication signal is generated. As noted above, such a signal may be used either internal to the memory device or passed to a user via an output pin on the memory device. Furthermore, such a signal may be used to blow a fuse or store a non-volatile temper-attempt indication bit internal to the memory device such that upon next power-up the temper-attempt indication signal is available.

At step 612, one or more memory operations on the memory device are disabled in response to the tamper attempt indication. As also discussed above, such memory operation disabling is a responsive measure taken based on an indication that tampering has been attempted. As such, the remedial measures taken in response to such a tamper attempt indication are independent from the technique used for tamper detection, and therefore may or may not be performed in conjunction with the tamper detection. As discussed in detail above, disabling one or more memory operations within the memory device at step 612 may include altering a voltage such as a bias voltage or controlling one or more transistors in order to limit current flow or gate the current flow off entirely.

At step 614, as a part of disabling a memory operation on the memory device, a mock current can be generated in response to an attempt to perform a memory operation that has been disabled. The mock current generated can be generated in a manner that attempts to replicate the expected magnitude of current that would normally exist on the device during performance of the memory operation that has been disabled, and yet is still being attempted by the user.

While exemplary embodiments have been presented above, it should be appreciated that many variations exist. Furthermore, while the description uses spin-torque MRAM devices that include an MTJ in the exemplary embodiments, the teachings may be applied to memory device or other devices that may be subjected to attempted tampering by the application of external sources of disruption such as magnetic fields, electromagnetic interference, heat sources, and charge bombardment. It should also be appreciated that the exemplary embodiments are only examples, and are not intended to limit the scope, applicability, or configuration of the inventions in any way.

What is claimed is:

1. A method of operation of a memory device that includes a plurality of data storage memory cells and a plurality of detection memory cells, the method comprising:
   comparing state of each detection memory cell of the plurality of detection memory cells with a corresponding reference bit of a plurality of reference bits;

determining, based on the comparing, a tamper-attempt indication corresponding to an attempt to tamper with data stored in the data storage memory cells;

in response to determining the tamper-attempt indication, disabling a memory operation within the memory device.

2. The method of claim 1 further comprises receiving a command indicating a tamper detection check, wherein the comparing occurs in response to the command.

3. The method of claim 1, wherein disabling the memory operation includes adjusting a bias voltage corresponding to a MOS-follower circuit.

4. The method of claim 3, wherein adjusting the bias voltage further comprises adjusting the bias voltage corresponding to the MOS-follower circuit such that current through a data storage memory cell is reduced to a level below a threshold level needed to switch a free portion of the memory cell.

5. The method of claim 1, wherein disabling the memory operation further comprises adjusting a voltage corresponding to a word line to limit current flow through a memory cell.

6. The method of claim 1, wherein disabling the memory operation further comprises adjusting a control voltage for a transistor to restrict or prevent current flow through a memory cell.

7. The method of claim 1, wherein disabling the memory operation further comprises adjusting an offset voltage corresponding to a sense amplifier such that accurate sensing of a state of a memory cell by the sense amplifier is impeded or prevented.

8. The method of claim 1, wherein disabling the memory operation further comprises generating a mock current in response to an attempt to perform the memory operation that is disabled.

9. The method of claim 1 further comprises erasing data stored in at least a portion of the plurality of data storage memory cells in response to attempted performance of the memory operation that has been disabled.

10. The method of claim 1 wherein disabling the memory operation further comprises disabling the memory operation using data masking circuitry on the memory device.

11. A method of operation of a memory device that includes a plurality of data storage memory cells and a plurality of detection memory cells, the method comprising:
   comparing state of each detection memory cell of the plurality of detection memory cells with a corresponding reference bit of a plurality of reference bits;
   determining, based on the comparing, a tamper-attempt indication corresponding to an attempt to tamper with data stored in the data storage memory cells;
   in response to determining the tamper-attempt indication, disabling a memory operation within the memory device by adjusting a bias voltage used in performing the memory operation; and
   after disabling the memory operation, generating a current on the memory device in response to an attempt to perform the memory operation that is disabled.

12. The method of claim 11, wherein generating the current includes generating the current such that a magnitude of the current generated approximates a magnitude of current that is generated by circuitry on the memory device during performance of the memory operation when the memory operation is not disabled.

13. The method of claim 11, wherein generating the current further includes generating the current based at least in part on data associated with the memory operation that has been disabled.

14. The method of claim 11, further comprises:
   in response to determining the tamper-attempt indication, erasing data stored in at least a portion of the plurality of data storage memory cells.

15. The method of claim 11 further comprises:
   detecting an indication that the memory operation that has been disabled is to be enabled; and
   restoring the voltage such that the memory operation is no longer disabled.

16. A method of operation of a memory device that includes a plurality of data storage memory cells and a plurality of detection memory cells, the method comprising:
   comparing state of each detection memory cell of the plurality of detection memory cells with a corresponding reference bit of a plurality of reference bits;
   determining, based on the comparing, a tamper-attempt indication corresponding to an attempt to tamper with data stored in the data storage memory cells;
   in response to determining the tamper-attempt indication, disabling a memory operation within the memory device; and
   after disabling the memory operation and in response to an attempt to perform the memory operation that is disabled:
      generating a current on the memory device such that a magnitude of the current generated approximates a magnitude of current that is generated by circuitry on the memory device during performance of the memory operation when the memory operation is not disabled; and
      erasing data stored in at least a portion of the plurality of data storage memory cells.

17. The method of claim 16, wherein each memory cell of the plurality of data storage memory cells is written to a first state using a first current flowing in a first direction through the memory cell and written to a second state using a second current flowing in a second direction through the memory cell, wherein the second direction is substantially opposite the first direction, the method further comprising erasing data stored in the array by adjusting a first bias voltage corresponding to the first current such that the first current is inadequate to write the first state to the memory cell.

18. The method of claim 16, wherein disabling the memory operation includes adjusting at least one bias voltage corresponding to at least one MOS-follower circuit on the memory device used in the memory operation such that the memory operation disabled.

19. The method of claim 18, wherein the at least one bias voltage corresponds to at least one of a column control bias voltage, a row control bias voltage, and a word line control bias voltage.

20. The method of claim 16 wherein disabling the memory operation further comprises disabling the memory operation using data masking circuitry on the memory device.

* * * * *